US012307975B2

(12) United States Patent
Cao et al.

(10) Patent No.: US 12,307,975 B2
(45) Date of Patent: May 20, 2025

(54) PIXEL DRIVING CIRCUIT, METHOD FOR DRIVING PIXEL DRIVING CIRCUIT AND DISPLAY APPARATUS

(71) Applicants: Chengdu BOE Optoelectronics Technology Co., Ltd., Sichuan (CN); BOE TECHNOLOGY GROUP CO., LTD., Beijing (CN)

(72) Inventors: Dan Cao, Beijing (CN); Wenhui Gao, Beijing (CN); Yonglin Guo, Beijing (CN); Huijuan Yang, Beijing (CN); Tiaomei Zhang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/696,425

(22) PCT Filed: Sep. 30, 2022

(86) PCT No.: PCT/CN2022/123087
§ 371 (c)(1),
(2) Date: Mar. 28, 2024

(87) PCT Pub. No.: WO2024/065614
PCT Pub. Date: Apr. 4, 2024

(65) Prior Publication Data

US 2025/0046247 A1 Feb. 6, 2025

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01);
(Continued)

(58) Field of Classification Search
CPC ................... G09G 3/3233; G09G 3/32; G09G 2300/0819; G09G 2300/0852; G09G 2310/08; G09G 2330/04
(Continued)

(56) References Cited

U.S. PATENT DOCUMENTS 11,170,719 B1 * 11/2021 Lu ........................ G09G 3/3291
11,735,098 B2 * 8/2023 Takasugi .............. G09G 3/3233 345/204
(Continued)

FOREIGN PATENT DOCUMENTS

CN 106023900 A 10/2016
CN 106952615 A 7/2017
(Continued)

*Primary Examiner* — Tom V Sheng
(74) *Attorney, Agent, or Firm* — HOUTTEMAN LAW LLC

(57) ABSTRACT

A pixel driving circuit, a method for driving the same and a display apparatus. The pixel driving circuit includes: a light-emitting device; a driving transistor which generates a current for driving the light-emitting device to emit light according to a data voltage; a first control circuit which conducts a first electrode of the driving transistor to a first node; a second control circuit which forms a current path from the first node to a first initialization signal terminal in a case where the first control circuit conducts the first electrode of the driving transistor to the first node, to allow a threshold voltage of the driving transistor to be input to the first node; a data writing circuit which inputs the data voltage of a data signal terminal to the first node.

20 Claims, 11 Drawing Sheets

(52) U.S. Cl.
CPC . *G09G 2300/0852* (2013.01); *G09G 2310/08* (2013.01); *G09G 2330/04* (2013.01)

(58) Field of Classification Search
USPC .......................................................... 345/204
See application file for complete search history.

(56) References Cited

U.S. PATENT DOCUMENTS

| | | | | |
|---|---|---|---|---|
| 11,862,091 | B1 * | 1/2024 | Cheng | G09G 3/3233 |
| 11,967,279 | B2 * | 4/2024 | Liu | G09G 3/3233 |
| 2014/0028647 | A1 * | 1/2014 | Woo | G09G 3/3233 345/76 |
| 2015/0130779 | A1 * | 5/2015 | Chang | G09G 3/3233 345/212 |
| 2016/0365031 | A1 * | 12/2016 | Wu | G09G 3/3275 |
| 2017/0178567 | A1 * | 6/2017 | Kang | G09G 3/3291 |
| 2019/0213957 | A1 * | 7/2019 | Gao | G09G 3/3233 |
| 2019/0266946 | A1 * | 8/2019 | Zhu | G09G 3/3233 |
| 2019/0385527 | A1 * | 12/2019 | Mao | G09G 3/3233 |
| 2020/0202794 | A1 * | 6/2020 | Chen | G09G 3/3291 |
| 2021/0174743 | A1 * | 6/2021 | Chang | G09G 3/3258 |
| 2021/0201759 | A1 * | 7/2021 | Cho | G09G 3/3233 |
| 2021/0201827 | A1 * | 7/2021 | Jang | G09G 3/3291 |
| 2021/0358397 | A1 * | 11/2021 | Gao | G09G 3/3266 |
| 2021/0366362 | A1 * | 11/2021 | Xuan | G09G 3/3233 |
| 2021/0375210 | A1 * | 12/2021 | Xuan | G09G 3/3258 |
| 2021/0398482 | A1 * | 12/2021 | Wang | G09G 3/3233 |
| 2022/0335897 | A1 * | 10/2022 | Lai | G09G 3/3258 |
| 2022/0392985 | A1 * | 12/2022 | Song | G09G 3/3233 |
| 2023/0186850 | A1 * | 6/2023 | Wang | G09G 3/3266 345/211 |
| 2023/0206834 | A1 * | 6/2023 | Liu | G09G 3/3233 345/212 |
| 2024/0013715 | A1 * | 1/2024 | Li | G09G 3/32 |
| 2024/0213270 | A1 * | 6/2024 | Guo | H10D 86/60 |

FOREIGN PATENT DOCUMENTS

| | | | |
|---|---|---|---|
| CN | 110176213 | A | 8/2019 |
| CN | 112071269 | A | 12/2020 |
| CN | 113066426 | A | 7/2021 |
| CN | 113129818 | A | 7/2021 |
| CN | 113870789 | A | 12/2021 |
| CN | 115035845 | A | 9/2022 |
| KR | 20050109166 | A | 11/2005 |

* cited by examiner

PIXEL DRIVING CIRCUIT, METHOD FOR DRIVING PIXEL DRIVING CIRCUIT AND DISPLAY APPARATUS

CROSS-REFERENCE TO RELATED APPLICATIONS

The present disclosure is a National Phase Application filed under 35 U.S.C. 371 as a national stage of PCT/CN2022/123087 filed on Sep. 30, 2022, the content of which is incorporated herein in their entirety by reference.

TECHNICAL FIELD

The present disclosure relates to the field of display technologies, and in particular, to a pixel driving circuit, a method for driving the pixel driving circuit, and a display apparatus.

BACKGROUND

Light-Emitting devices such as Organic Light-Emitting Diodes (OLEDs), Quantum Dot Light-Emitting Diodes (QLEDs), Micro Light-Emitting Diodes (Micro LEDs), and Mini Light-Emitting Diodes (Mini LEDs) have the advantages of self-illumination, low energy consumption, and the like, and are one of the hotspots in the application and research field of the display apparatus today. A pixel driving circuit is generally adopted in a display apparatus to drive a light-emitting device to emit light.

SUMMARY

An embodiment of the present disclosure provides a pixel driving circuit, including:

a light-emitting device;

a driving transistor configured to generate a current for driving the light-emitting device to emit light according to a data voltage;

a first control circuit configured to conduct a first electrode of the driving transistor to a first node in response to a signal at a first scan signal terminal;

a second control circuit configured to form, in response to signals at a second scan signal terminal and a third scan signal terminal, a current path from the first node to a first initialization signal terminal in a case where the first control circuit conducts the first electrode of the driving transistor to the first node, to allow a threshold voltage of the driving transistor to be input to the first node;

a data writing circuit configured to input the data voltage of a data signal terminal to the first node in response to a signal at a fourth scan signal terminal to change a voltage of the first node from V1−Vth to Vda;

a third control circuit configured to supply a signal at a second initialization signal terminal to a gate of the driving transistor in response to the signal at the first scan signal terminal, to supply a signal at a third initialization signal terminal to the first electrode of the driving transistor in response to a signal at a fifth scan signal terminal, and to supply a signal at a first power terminal to the first electrode of the driving transistor in response to a signal at a light emission control signal terminal;

a first storage circuit configured to keep a voltage difference between the first node and the first power terminal stable; and a second storage circuit configured to keep a voltage difference between the first node and the gate of the driving transistor stable, and to change a voltage of the gate of the driving transistor from V1 to Vda+Vth in a case that the voltage of the first node is changed from V1−Vth to Vda, where V1 represents a voltage value of a second initialization signal at the second initialization signal terminal, Vth represents the threshold voltage of the driving transistor, and Vda represents the data voltage loaded onto the data signal terminal.

In some possible implementations, a second electrode of the driving transistor is coupled to the light-emitting device through the second control circuit; and the second control circuit is configured to conduct the second electrode of the driving transistor to the light-emitting device in response to the signal at the third scan signal terminal, and to supply a signal at the first initialization signal terminal to the light-emitting device in response to the signal at the second scan signal terminal.

In some possible implementations, the second control circuit includes a first transistor and a second transistor;

a gate of the first transistor is coupled to the third scan signal terminal, a first electrode of the first transistor is coupled to the light-emitting device, and a second electrode of the first transistor is coupled to the second electrode of the driving transistor; and a gate of the second transistor is coupled to the second scan signal terminal, a first electrode of the second transistor is coupled to the light-emitting device, and a second electrode of the second transistor is coupled to the first initialization signal terminal.

In some possible implementations, a second electrode of the driving transistor is coupled to the light-emitting device, and the second control circuit is coupled to the light-emitting device; and the second control circuit is configured to supply the signal at the first initialization signal terminal to the second electrode of the driving transistor in response to a common control of the signals at the second scan signal terminal and the third scan signal terminal.

In some possible implementations, the second control circuit includes a first transistor and a second transistor;

a gate of the first transistor is coupled to the third scan signal terminal, a first electrode of the first transistor is coupled to the second electrode of the driving transistor, and a second electrode of the first transistor is coupled to a first electrode of the second transistor; and a gate of the second transistor is coupled to the second scan signal terminal, and a second electrode of the second transistor is coupled to the first initialization signal terminal.

In some possible implementations, the first control circuit includes a third transistor; and a gate of the third transistor is coupled to the first scan signal terminal, a first electrode of the third transistor is coupled to the first electrode of the driving transistor, and a second electrode of the third transistor is coupled to the first node.

In some possible implementations, the data writing circuit includes a fourth transistor; and a gate of the fourth transistor is coupled to the fourth scan signal terminal, a first electrode of the fourth transistor is coupled to the data signal terminal, and a second electrode of the fourth transistor is coupled to the first node.

In some possible implementations, the third control circuit includes a fifth transistor, a sixth transistor, and a seventh transistor;

a gate of the fifth transistor is coupled to the first scan signal terminal, a first electrode of the fifth transistor is coupled to the gate of the driving transistor, and a second electrode of the fifth transistor is coupled to the second initial voltage signal terminal;

a gate of the sixth transistor is coupled to the fifth scan signal terminal, a first electrode of the sixth transistor is coupled to the first electrode of the driving transistor, and a second electrode of the sixth transistor is coupled to the third initialization signal terminal; and a gate of the seventh transistor is coupled to the light emission control signal terminal, a first electrode of the seventh transistor is coupled to the first electrode of the driving transistor, and a second electrode of the seventh transistor is coupled to the first power terminal.

In some possible implementations, the first storage circuit includes a first capacitor having a first electrode coupled to the first power terminal and a second electrode coupled to the first node; and/or the second storage circuit includes a second capacitor having a first electrode coupled to the first node and a second electrode coupled to the gate of the driving transistor.

In some possible implementations, the third scan signal terminal and the fifth scan signal terminal are a single signal terminal.

In some possible implementations, a phase of the signal at the third scan signal terminal is opposite to a phase of the signal at the fifth scan signal terminal.

In some possible implementations, the first scan signal terminal and the second scan signal terminal are a single signal terminal.

An embodiment of the present disclosure provides a display apparatus, including the pixel driving circuit described above.

A method for driving the pixel driving circuit provided by the embodiment of the present disclosure includes an initialization period, a threshold compensation period, a data writing period and a light-emitting period, where, in the initialization period, the first control circuit conducts, in response to the signal at the first scan signal terminal, the first electrode of the driving transistor to the first node; the second control circuit forms, in response to the signals at the second scan signal terminal and the third scan signal terminal, the current path from the first node to the first initialization signal terminal; the third control circuit supplies, in response to the signal at the first scan signal terminal, the signal at the second initialization signal terminal to the gate of the driving transistor;

in the threshold compensation period, the first control circuit conducts, in response to the signal at the first scan signal terminal, the first electrode of the driving transistor to the first node; the second control circuit forms, in response to the signals at the second scan signal terminal and the third scan signal terminal, the current path from the first node to the first initialization signal terminal, to allow the threshold voltage of the driving transistor to be input into the first node; the third control circuit supplies, in response to the signal at the first scan signal terminal, the signal at the second initialization signal terminal to the gate of the driving transistor;

in the data writing period, the data writing circuit inputs, in response to the signal at the fourth scan signal terminal, the data voltage of the data signal terminal into the first node, to change the voltage of the first node from V1−Vth to Vda; the voltage of the gate of the driving transistor is changed from V1 to Vda+Vth due to the action of the second storage circuit, where V1 represents the voltage value of the second initialization signal at the second initialization signal terminal, Vth represents the threshold voltage of the driving transistor, and Vda represents the data voltage loaded onto the data signal terminal;

in the light-emitting period, the third control circuit supplies, in response to the signal at the light emission control signal terminal, the signal at the first power terminal to the first electrode of the driving transistor; the second control circuit conducts, in response to the signal at the third scan signal terminal, the second electrode of the driving transistor to the light-emitting device.

DETAIL DESCRIPTION OF EMBODIMENTS

Figure 1:
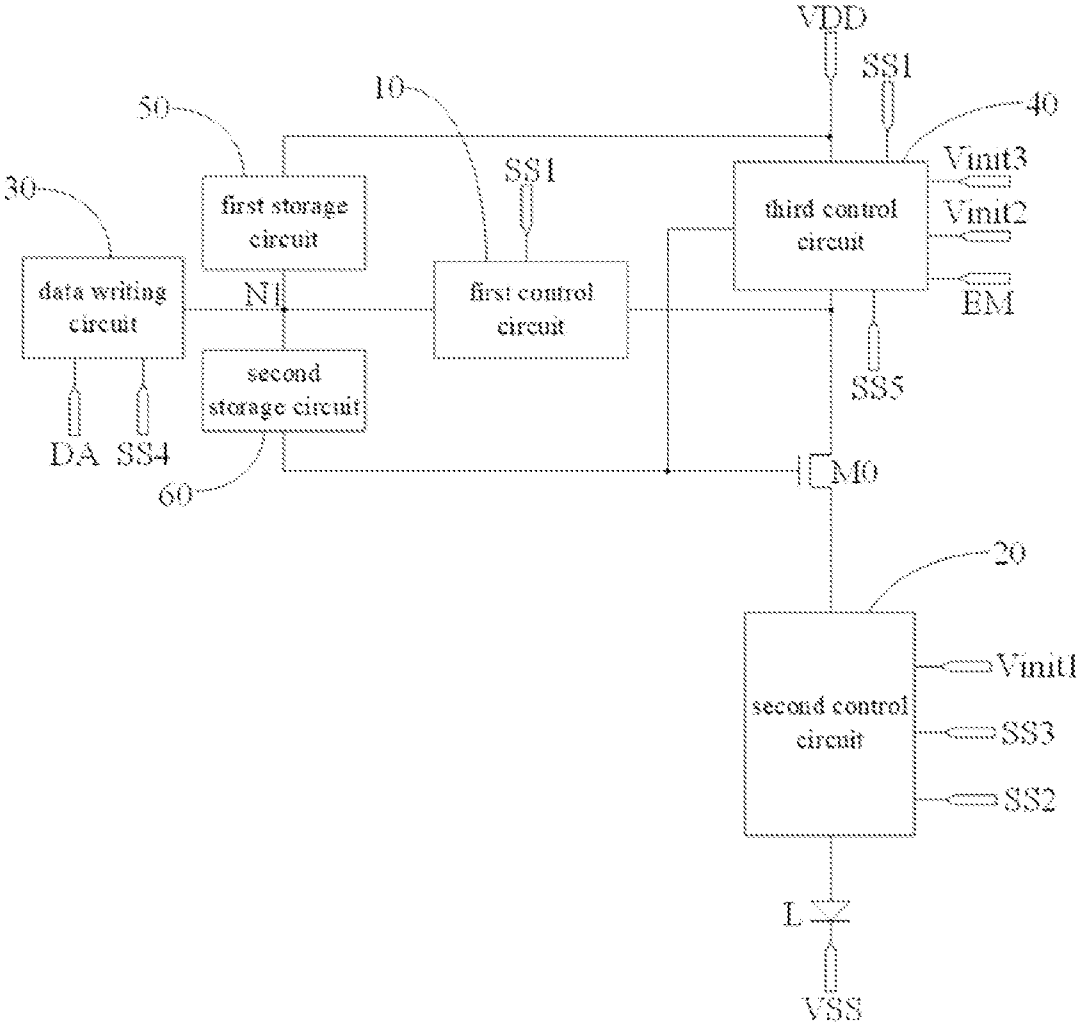
FIG. 1 is a schematic structural diagram of a pixel driving circuit according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. The embodiments and features of the embodiments in the present disclosure may be combined with each other without conflict. All other embodiments, which can be derived by a person skilled in the art from the described embodiments of the present disclosure without creative effort, are within the protection scope of the present disclosure.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. The word "comprising/including", "comprises/includes" or the like, means that the element or item preceding the word comprises/includes the element or item listed after the word and its equivalent, but does not exclude other elements or items. The word "connected/coupled", "connecting/coupling", or the like is not restricted to physical or mechanical connections, but may include electrical connections, whether direct or indirect.

It should be noted that sizes and shapes of various elements in the drawings are not to scale, but are merely intended to illustrate the present disclosure. Like reference numerals refer to like or similar elements or elements having like or similar functions throughout the description.

A display apparatus according to an embodiment of the present disclosure includes: a display panel including a plurality of pixel units arranged in an array in a display area of the display panel, and each pixel unit includes a plurality of sub-pixels. Illustratively, each pixel unit includes a plurality of sub-pixels, for example, the pixel unit may include a red sub-pixel, a green sub-pixel, and a blue sub-pixel, so that red, green, and blue may be mixed to implement color display. Alternatively, the pixel unit may include a red sub-pixel, a green sub-pixel, a blue sub-pixel, and a white sub-pixel, so that red, green, blue, and white may be mixed to implement color display. Certainly, in practical applications, the colors of light emitted by the sub-pixels in the pixel unit may be determined according to practical application environments, and is not limited herein.

In the embodiment of the present disclosure, each sub-pixel includes a pixel driving circuit, and the pixel driving circuit includes a driving transistor and a light-emitting device, the driving transistor controls the light-emitting device to emit light, so that the display panel display a picture.

The embodiment of the present disclosure provides a pixel driving circuit, as shown in FIG. 1, including: a light-emitting device L, a driving transistor M0, a first control circuit 10, a second control circuit 20, a data writing circuit 30, a third control circuit 40, a first storage circuit 50, and a second storage circuit 60.

The driving transistor M0 is configured to generate, according to a data voltage, a current for driving the light-emitting device L to emit light. The first control circuit 10 is configured to conduct a first electrode of the driving transistor M0 to a first node in response to a signal at a first scan signal terminal SS1 (that is, the first control circuit 10 is configured to electrically connect a first electrode of the driving transistor M0 to a first node in response to a signal at a first scan signal terminal SS1). The second control circuit 20 is configured to form, in response to signals at a second scan signal terminal SS2 and a third scan signal terminal SS3 and when the first control circuit 10 conducts the first electrode of the driving transistor M0 to the first node N1, a current path from the first node N1 to a first initialization signal terminal Vinit1, so that a threshold voltage Vth of the driving transistor M0 is input to the first node N1. The data writing circuit 30 is configured to input a data voltage Vda of a data signal terminal DA to the first node N1 in response to a signal at a fourth scan signal terminal SS4, so that a voltage of the first node N1 is changed from V1−Vth to Vda. The third control circuit 40 is configured to supply a signal at a second initialization signal terminal Vinit2 to a gate of the driving transistor M0 in response to the signal at the first scan signal terminal SS1, supply a signal at a third initialization signal terminal Vinit3 to a first electrode of the driving transistor M0 in response to a signal at a fifth scan signal terminal SS5, and supply a signal at a first power terminal VDD to the first electrode of the driving transistor M0 in response to a signal at a light emission control signal terminal EM. The first storage circuit 50 is configured to keep a voltage difference between the first node N1 and the first power terminal VDD stable. The second storage circuit 60 is configured to keep a voltage difference between the first node N1 and the gate of the driving transistor M0 stable, and to change the voltage of the gate of the driving transistor M0 from V1 to Vda+Vth when the voltage of the first node N1 is changed from V1−Vth to Vda, where V1 represents a voltage value of the second initialization signal at the second initialization signal terminal Vinit2, Vth represents the threshold voltage of the driving transistor M0, and Vda represents the data voltage applied by the data signal terminal DA.

In the embodiment of the present disclosure, by providing the first control circuit, the second control circuit, the data writing circuit, the third control circuit, the first storage circuit, and the second storage circuit, it is realized that a time period for initializing the driving transistor does not overlap with a time period for threshold compensation of the threshold voltage Vth of the driving transistor, so that a part of current paths in the pixel driving circuit can be blocked, thereby reducing current in the pixel driving circuit, reducing risk of short circuit and risk of burning in the pixel driving circuit, and thus improving performance of the pixel driving circuit.

In some implementations of the present disclosure, as shown in FIG. 1, the driving transistor M0 may be a P-type transistor; the first electrode of the driving transistor M0 may be a source thereof, a second electrode of the driving transistor M0 may be a drain thereof, and when the driving transistor M0 is in a saturation state, a current flows from the source of the driving transistor M0 to the drain of the driving transistor M0. Alternatively, the driving transistor M0 may be an N-type transistor, which is not limited herein.

In the embodiment of the present disclosure, as shown in FIG. 1, a first electrode of the light-emitting device L may be coupled to the second electrode of the driving transistor M0 through the second control circuit 20. The second electrode of the light-emitting device L may be coupled to a second power terminal VSS. In some examples, the first electrode of the light-emitting device L may be an anode thereof and the second electrode of the light-emitting device L is a cathode thereof. Illustratively, the light-emitting device L may be an organic light-emitting diode. For example, the light-emitting device L may include: at least one of a Micro Light-Emitting Diode (Micro LED), an Organic Light-Emitting Diode (OLED), or a Quantum Dot Light-Emitting Diode (QLED). Illustratively, the light-emitting device L may include the anode, a light-emitting layer, and the cathode, which are stacked. Further, the light-emitting layer may further include a hole injection layer, a hole transport layer, an electron transport layer, an electron injection layer, and the like. In practical applications, the specific structure of the light-emitting device L may be designed and determined according to practical application environments, and is not limited herein.

Figure 2:
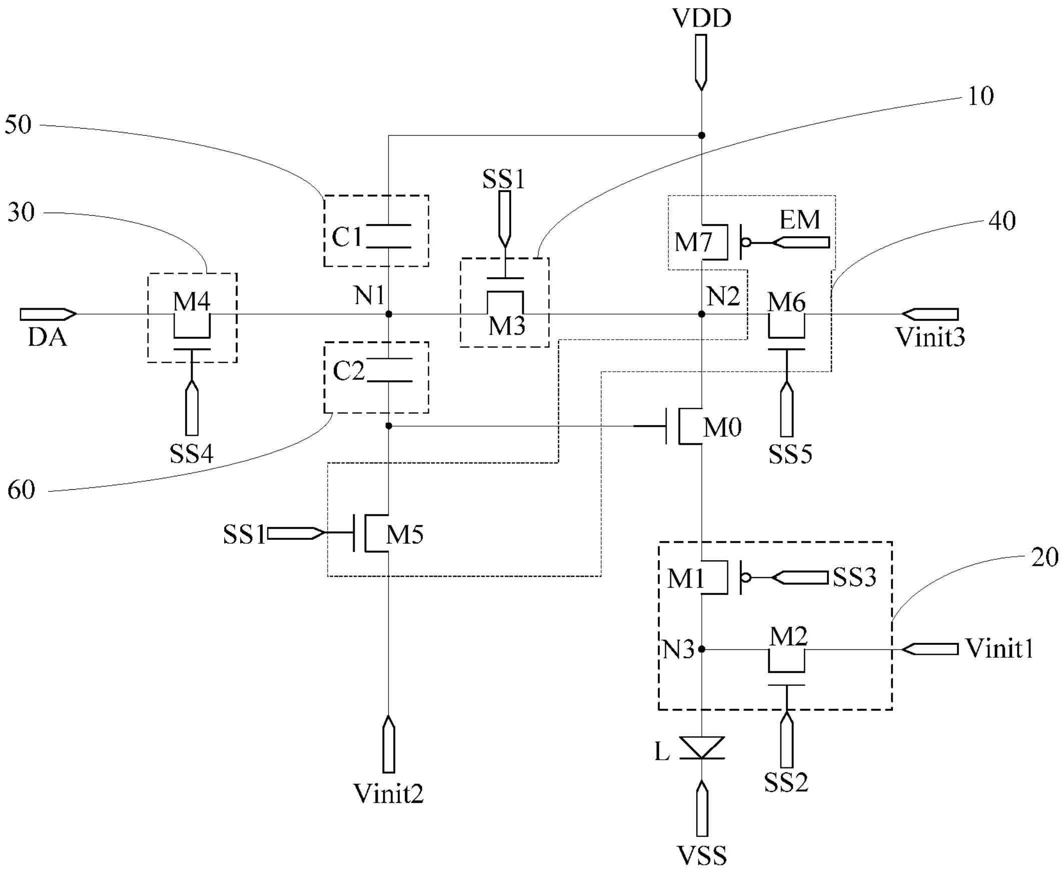
FIG. 2 is a schematic structural diagram of a pixel driving circuit according to an embodiment of the present disclosure.

In the embodiment of the present disclosure, as shown in FIG. 2, the second electrode of the driving transistor M0 is coupled to the light-emitting device L through the second control circuit 20. The second control circuit 20 is configured to conduct the second electrode of the driving transistor M0 to the light-emitting device L in response to the signal at the third scan signal terminal SS3, and to supply the signal at the first initialization signal terminal Vinit1 to the light-emitting device L in response to the signal at the second scan signal terminal SS2.

In the embodiment of the present disclosure, as shown in FIG. 2, the second control circuit 20 includes a first transistor M1 and a second transistor M2; a gate of the first transistor M1 is coupled to the third scan signal terminal SS3, a first electrode of the first transistor M1 is coupled to the light-emitting device L, and a second electrode of the first transistor M1 is coupled to the second electrode of the driving transistor M0. A gate of the second transistor M2 is coupled to the second scan signal terminal SS2, a first electrode of the second transistor M2 is coupled to the light-emitting device L, and a second electrode of the second transistor M2 is coupled to the first initialization signal terminal Vinit1.

Illustratively, the first transistor M1 may be turned on under the control of an active level of a third scan signal transmitted from the third scan signal terminal SS3, and may be turned off under the control of an inactive level of the third scan signal. Illustratively, the first transistor M1 may be a P-type transistor, and then the active level of the third scan signal is a low level, and the inactive level of the third scan signal is a high level. Alternatively, the first transistor M1 may be an N-type transistor, and the active level of the third scan signal is a high level and the inactive level of the third scan signal is a low level.

Illustratively, the second transistor M2 may be turned on under the control of an active level of a second scan signal transmitted from the second scan signal terminal SS2, and may be turned off under the control of an inactive level of the second scan signal. Illustratively, the second transistor M2 may be an N-type transistor, and then the active level of the second scan signal is a high level and the inactive level of the second scan signal is a low level. Alternatively, the second transistor M2 may be a P-type transistor, and the active level of the second scan signal is a low level, and the inactive level of the second scan signal is a high level.

In the embodiment of the present disclosure, as shown in FIG. 2, the first control circuit 10 includes a third transistor M3; a gate of the third transistor M3 is coupled to the first scan signal terminal SS1, a first electrode of the third transistor M3 is coupled to the first electrode of the driving transistor M0, and a second electrode of the third transistor M3 is coupled to the first node N1.

Illustratively, the third transistor M3 may be turned on under the control of an active level of a first scan signal transmitted from the first scan signal terminal SS1, and may be turned off under the control of an inactive level of the first scan signal. Illustratively, the third transistor M3 may be an N-type transistor, and the active level of the first scan signal is a high level and the inactive level of the first scan signal is a low level. Alternatively, the third transistor M3 may be a P-type transistor, then the active level of the first scan signal is a low level, and the inactive level of the first scan signal is a high level.

In the embodiment of the present disclosure, as shown in FIG. 2, the data writing circuit 30 includes a fourth transistor M4; a gate of the fourth transistor M4 is coupled to the fourth scan signal terminal SS4, a first electrode of the fourth transistor M4 is coupled to the data signal terminal DA, and a second electrode of the fourth transistor M4 is coupled to the first node N1.

Illustratively, the fourth transistor M4 may be turned on under the control of an active level of a fourth scan signal transmitted from the fourth scan signal terminal SS4, and may be turned off under the control of an inactive level of the fourth scan signal. Illustratively, the fourth transistor M4 may be an N-type transistor, and then the active level of the fourth scan signal is a high level and the inactive level of the fourth scan signal is a low level. Alternatively, the fourth transistor M4 may be a P-type transistor, then the active level of the fourth scan signal is a low level, and the inactive level of the fourth scan signal is a high level.

In the embodiment of the present disclosure, as shown in FIG. 2, the third control circuit 40 includes a fifth transistor M5, a sixth transistor M6, and a seventh transistor M7; a gate of the fifth transistor M5 is coupled to the first scan signal terminal SS1, a first electrode of the fifth transistor M5 is coupled to the gate of the driving transistor M0, and a second electrode of the fifth transistor M5 is coupled to a second initial voltage signal terminal Vinit2; a gate of the sixth transistor M6 is coupled to the fifth scan signal terminal SS5, a first electrode of the sixth transistor M6 is coupled to the first electrode of the driving transistor M0, and a second electrode of the sixth transistor M6 is coupled to a third initial voltage signal terminal Vinit3. A gate of the seventh transistor M7 is coupled to the light emission control signal terminal EM, a first electrode of the seventh transistor M7 is coupled to the first electrode of the driving transistor M0, and a second electrode of the seventh transistor M7 is coupled to the first power terminal VDD.

Illustratively, the fifth transistor M5 may be turned on under the control of an active level of the first scan signal transmitted by the first scan signal terminal SS1, and may be turned off under the control of an inactive level of the first scan signal. Illustratively, the fifth transistor M5 may be an N-type transistor, and the active level of the first scan signal is a high level and the inactive level of the first scan signal is a low level. Alternatively, the fifth transistor M5 may be a P-type transistor, then the active level of the first scan signal is a low level, and the inactive level of the first scan signal is a high level.

Illustratively, the sixth transistor M6 may be turned on under the control of an active level of a fifth scan signal transmitted from the fifth scan signal terminal SS5, and may be turned off under the control of an inactive level of the fifth scan signal. Illustratively, the sixth transistor M6 may be an N-type transistor, and then the active level of the fifth scan signal is a high level and the inactive level of the fifth scan signal is a low level. Alternatively, the sixth transistor M6 may be a P-type transistor, and the active level of the fifth scan signal is a low level and the inactive level of the fifth scan signal is a high level.

Illustratively, the seventh transistor M7 may be turned on under the control of an active level of an emission control signal transmitted from the light emission control signal terminal EM, and may be turned off under the control of an inactive level of the emission control signal. Illustratively, the seventh transistor M7 may a P-type transistor, then the active level of the light emission control signal active level is a low level, and the inactive level of the light emission control signal inactive level is a high level. Alternatively, the seventh transistor M7 may be an N-type transistor, then the active level of the light emission control signal is a high level, and the inactive level of the light emission control signal is a low level.

In the embodiment of the present disclosure, as shown in FIG. 2, the first storage circuit 50 includes a first capacitor C1, a first electrode of the first capacitor C1 is coupled to the first power terminal VDD, and a second electrode of the first capacitor C1 is coupled to the first node N1.

In the embodiment of the present disclosure, as shown in FIG. 2, the second storage circuit 60 includes a second capacitor C2, a first electrode of the second capacitor C2 is coupled to the first node N1, and a second electrode of the second capacitor C2 is coupled to the gate of the driving transistor M0.

For example, the first electrode of each transistor may be a source thereof, and the second electrode of each transistor may be a drain thereof. Alternatively, the first electrode of each transistor is the drain and the second electrode of each transistor is the source, which is not limited herein.

Generally, a transistor using a Low Temperature Polysilicon (LTPS) material as an active layer has high mobility, can be made thinner and smaller, has lower power consumption, and the like. In practical applications, the active layer of at least one of the above-described transistors may be made of the LTPS material, so that the above-described transistor may be an LTPS transistor, and therefore, the pixel driving circuit can have high mobility and can be made thinner and smaller, have lower power consumption, and the like.

A leakage current of a transistor that generally use a metal oxide semiconductor material to form the active layer thereof is relatively small. Therefore, in order to reduce the leakage current, in some implementations of the present disclosure, the active layer of the at least one transistor may alternatively be made of the metal oxide semiconductor material, for example, IGZO (Indium Gallium Zinc Oxide) or other metal oxide semiconductor materials, which is not limited herein. In this way, the above-described transistor may be an oxide thin film transistor (Oxide transistor) so that the leak current of the pixel driving circuit can be reduced.

Illustratively, all the transistors may be LTPS transistors. Alternatively, all the transistors may be metal oxide transistors. Alternatively, a part of the transistors may be metal oxide transistors and the rest of the transistors may be LTPS transistors. For example, the second transistor M2, the third transistor M3, the fourth transistor M4, the fifth transistor M5 and the sixth transistor M6 may be metal oxide transistors, and the driving transistor M0, the first transistor M1 and the seventh transistor M7 may be LTPS transistors. Thus, by combining the processes for manufacturing the LTPS transistors and the metal oxide transistors, an LTPO pixel driving circuit of low-temperature poly-silicon oxide may be manufactured, so that the leakage current of the gate of the driving transistor M0 can be reduced, and the power consumption of the pixel driving circuit can be reduced.

In the embodiment of the present disclosure, the first power terminal VDD may be configured to supply a constant first power voltage Vdd, and the first power voltage Vdd generally has a positive voltage value. The second power terminal VSS may be configured to supply a constant second power voltage vss, and the second power voltage vss may be a ground voltage or has a negative voltage value. In practical applications, the specific values of the first power voltage vdd and the second power voltage vss may be designed according to practical application environments, and are not limited herein.

The foregoing is merely an example of a specific structure of the pixel driving circuit according to the embodiment of the present disclosure, and in implementation, the specific structure of the pixel driving circuit is not limited to the above structure according to the embodiment of the present disclosure, and may be other structures known to those skilled in the art, which are within the protection scope of the present disclosure, and are not limited herein.

Figure 3:
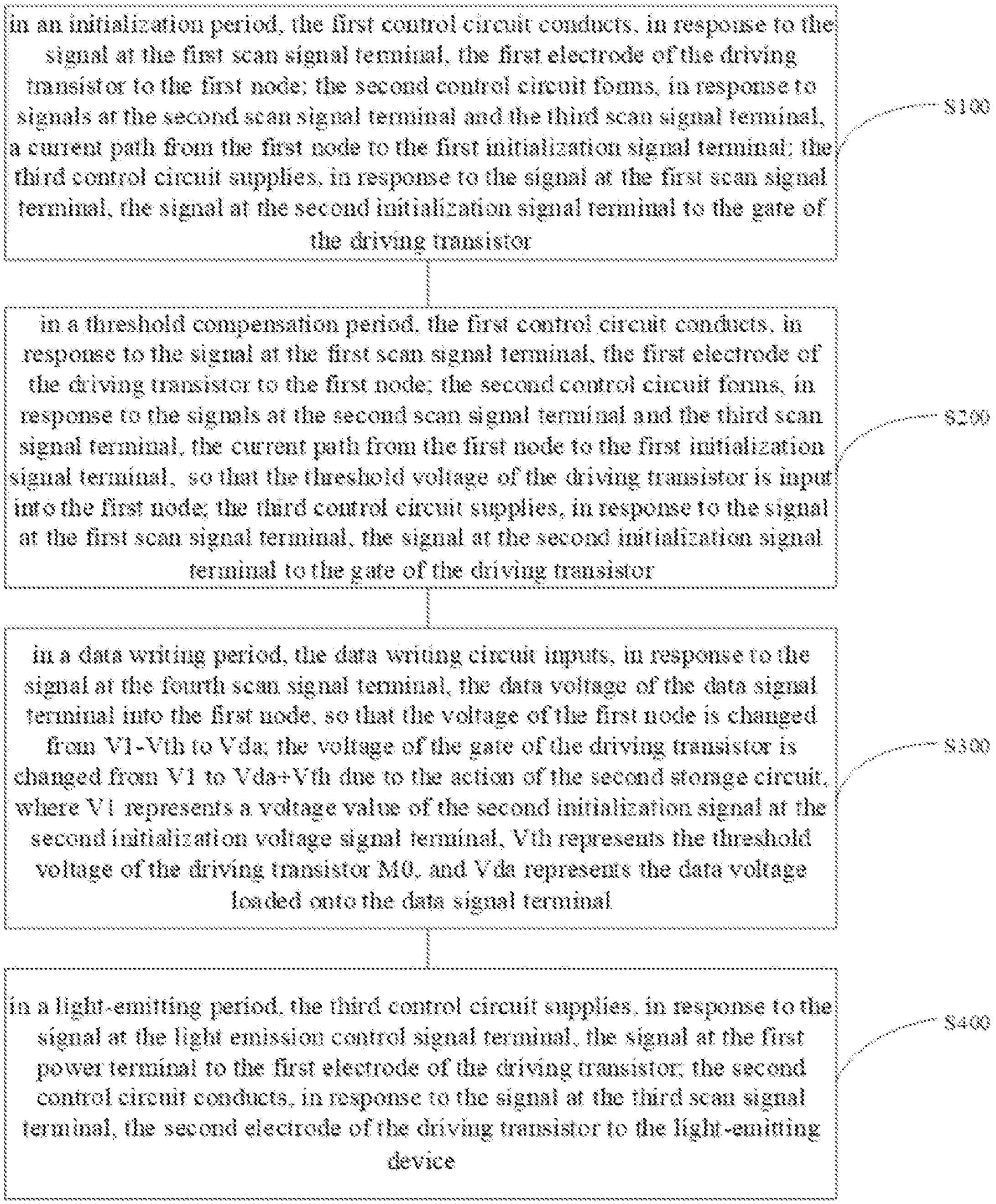
FIG. 3 is a flowchart of a method for driving a pixel driving circuit according to an embodiment of the present disclosure.

In an embodiment of the present disclosure, as shown in FIG. 3, a method for driving the pixel driving circuit provided in the embodiment of the present disclosure may include the following steps S100 to S400.

At step S100, in an initialization period, the first control circuit conducts, in response to the signal at the first scan signal terminal, the first electrode of the driving transistor to the first node; the second control circuit forms, in response to signals at the second scan signal terminal and the third scan signal terminal, a current path from the first node to the first initialization signal terminal; the third control circuit supplies, in response to the signal at the first scan signal terminal, the signal at the second initialization signal terminal to the gate of the driving transistor.

At step S200, in a threshold compensation period, the first control circuit conducts, in response to the signal at the first scan signal terminal, the first electrode of the driving transistor to the first node; the second control circuit forms, in response to the signals at the second scan signal terminal and the third scan signal terminal, the current path from the first node to the first initialization signal terminal, so that the threshold voltage of the driving transistor is input into the first node; the third control circuit supplies, in response to the signal at the first scan signal terminal, the signal at the second initialization signal terminal to the gate of the driving transistor.

At step S300, in a data writing period, the data writing circuit inputs, in response to the signal at the fourth scan signal terminal, the data voltage of the data signal terminal into the first node, so that the voltage of the first node is changed from V1−Vth to Vda; the voltage of the gate of the driving transistor is changed from V1 to Vda+Vth due to the action of the second storage circuit, where V1 represents a voltage value of the second initialization signal at the second initialization signal terminal, Vth represents the threshold voltage of the driving transistor M0, and Vda represents the data voltage applied by the data signal terminal.

At step S400, in a light-emitting period, the third control circuit supplies, in response to the signal at the light emission control signal terminal, the signal at the first power terminal to the first electrode of the driving transistor; the second control circuit conducts, in response to the signal at the third scan signal terminal, the second electrode of the driving transistor to the light-emitting device.

Figure 4:
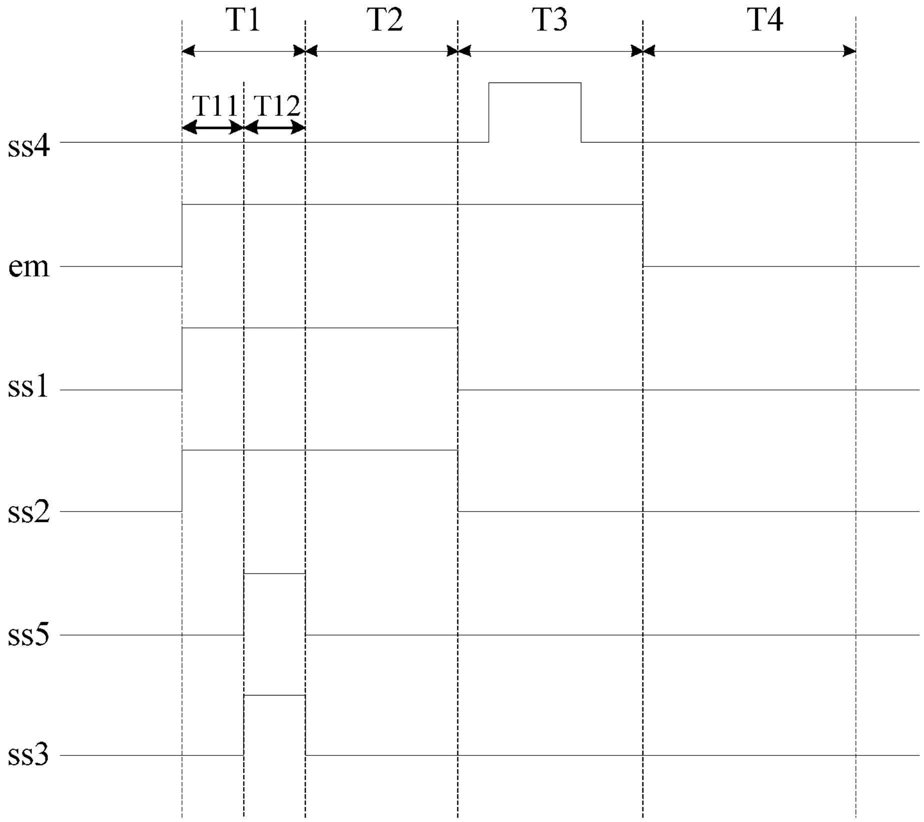
FIG. 4 is a timing diagram of signals for a pixel driving circuit according to an embodiments of the present disclosure.

The following describes an operation process of the pixel driving circuit provided in the embodiment of the present disclosure by taking the pixel driving circuit shown in FIG. 2 as an example and combining the timing diagram of signals shown in FIG. 4.

In the embodiment of the present disclosure, as shown in FIG. 4, em represents the light emission control signal at the light emission control signal terminal EM, ss1 represents the first scan signal at the first scan signal terminal SS1, ss2 represents the second scan signal at the second scan signal terminal SS2, ss3 represents the third scan signal at the third scan signal terminal SS3, ss4 represents the fourth scan signal at the fourth scan signal terminal SS4, and ss5 represents the fifth scan signal at the fifth scan signal terminal SS5.

Furthermore, an initialization period T1, a threshold compensation period T2, a data writing period T3, and a light-emitting period T4 in a display frame are selected.

In the initialization period T1, the initialization period T1 further includes a first period T11 and a second period T12, where during the first period T11, the first transistor M1 is turned on under the control of a low level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned off under the control of a high level of the light emission control signal em. The turned-on second transistor M2 inputs the first initialization signal at the first initialization signal terminal Vinit1 to the anode of the light-emitting device L (i.e., the third node N3) to initialize the anode of the light-emitting device L (i.e., the third node N3). The turned-on first transistor M1 inputs the first initialization signal input to the light-emitting device L (i.e., the third node N3) to the second electrode of the driving transistor M0. The turned-on third transistor M3 conducts the first electrode of the driving transistor M0 to the first node N1. The turned-on fifth transistor M5 inputs the second initialization signal at the second initialization signal terminal Vinit2 to the gate of the driving transistor M0 to initialize the gate of the driving transistor M0. When the third transistor M3 is turned on, the turned-on first transistor M1 and the turned-on second transistor M2 form the current path from the first node N1 to the first initialization signal terminal Vinit1.

In the second period T12, the first transistor M1 is turned off under the control of a high level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned on under the control of a high level of the fifth scan signal ss5, and the seventh transistor M7 is turned off under the control of a high level of the light emission control signal em. The turned-on second transistor M2 inputs the first initialization signal at the first initialization signal terminal Vinit1 to the anode of the light-emitting device L (i.e., the third node N3) to initialize the anode of the light-emitting device L (i.e., the third node N3). The turned-on fifth transistor M5 inputs the second initialization signal at the second initialization signal terminal Vinit2 to the gate of the driving transistor M0 to initialize the gate of the driving transistor M0. The turned-on sixth transistor M6 inputs the third initialization signal at the third initialization signal terminal Vinit3 to the first electrode of the driving transistor M0 (i.e., the second node N2) to initialize the first electrode of the driving transistor M0 (i.e., the second node N2). The turned-on third transistor M3 conducts the first electrode of the driving transistor M0 to the first node N1, so that the third initialization signal at the third initial voltage signal terminal Vinit3 is input to the first node N1 to initialize the first node N1. The third initialization signal at the third initialization signal terminal Vinit3 is a high level voltage, and the high level voltage is input to the first electrode of the driving transistor M0, so that the high level voltage can be applied to the first electrode of the driving transistor M0, and Vgs is ensured to be less than Vth, thereby ensuring that the driving transistor M0 is in a turned-on state. Furthermore, Vgs represents a voltage difference between the gate and the first electrode of the driving transistor M0, and Vth represents the threshold voltage of the driving transistor M0.

In the threshold compensation period T2, the first transistor M1 is turned on under the control of a low level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned off under the control of a high level of the light emission control signal em. The turned-on fifth transistor M5 inputs the second initialization signal at the second initialization signal terminal Vinit2 to the gate of the driving transistor M0, and a voltage at the gate of the driving transistor M0 is V1, where V1 represents a voltage value of the second initialization signal at the second initialization signal terminal Vinit2. The turned-on third transistor M3 conducts the first electrode of the driving transistor M0 to the first node N1. The turned-on second transistor M2 inputs the first initialization signal at the first initialization signal terminal Vinit1 to the anode of the light-emitting device L (i.e., the third node N3). The turned-on first transistor M1 conducts the second electrode of the driving transistor M0 to the anode of the light-emitting device L (i.e., the third node N3). When the driving transistor M0 is still in the turned-on state, the turned-on first transistor M1 and the turned-on second transistor M2 form a current path from the first node N1 to the first initialization signal terminal Vinit1 when the third transistor M3 is turned on, so that the threshold voltage Vth of the driving transistor M0 is input to the first node N1. In a case where Vgs is equal to Vth, the driving transistor M0 is turned off, and in this case, the voltage VN2 of the second node N2 is equal to a difference between V1 and the threshold voltage Vth, i.e., VN2=V1−Vth, and since the third transistor M3 is in the turned-on state, the voltage VN1 of the first node N1 is equal to VN2, that is, VN1=VN2=V1−Vth.

In the data writing period T3, the first transistor M1 is turned on under the control of a low level of the third scan signal ss3, the second transistor M2 is turned off under the control of a low level of the second scan signal ss2, the third transistor M3 and the fifth transistor M5 are turned off under the control of a low level of the first scan signal ss1, the fourth transistor M4 is turned on under the control of a high level of the fourth scan signal ss4, the sixth transistor M6 is turned off under the control of a low level of the fifth scan signal ss5, and the seventh transistor M7 is turned off under the control of a high level of the light emission control signal em. The turned-on fourth transistor M4 supplies the data voltage Vda loaded onto the data signal terminal DA to the driving transistor M0, the voltage VN1 of the first node N1 is changed from V1−Vth to Vda, and a voltage change amount of the first node N1 is ΔVN1, which is equal to Vda−V1+Vth. Due to the existence of the second capacitor C2, ΔVN1 is coupled to the voltage of the gate of the driving transistor M0 is, and the voltage of the gate of the driving transistor M0 jumps from V1 to Vda+Vth.

In the light-emitting period T4, the first transistor M1 is turned on under the control of a low level of the third scan signal ss3, the second transistor M2 is turned off under the control of a low level of the second scan signal ss2, the third transistor M3 and the fifth transistor M5 are turned off under the control of a low level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned on under the control of a low level of the light emission control signal em. The turned-on seventh transistor M7 conducts the first power terminal VDD to the first electrode of the driving transistor M0 (i.e., the second node N2), the turned-on first transistor M1 conducts the second electrode of the driving transistor M0 to the anode of the light-emitting device L (i.e., the third node N3), so that the driving transistor M0 generates a current for driving the light-emitting device L to emit light, and the first power terminal VDD, the seventh transistor M7, the driving transistor M0, the light-emitting device L and the second power terminal VSS form a current path, thereby driving the light-emitting device L to emit light.

In the embodiment of the present disclosure, in the period T12, since the sixth transistor M6 is turned on, the first transistor M1 is turned off, so that the first transistor M1 blocks the current path along the third initial voltage signal terminal Vinit3, the driving transistor M0, the second transistor M2 and the first initial voltage signal terminal Vinit1. That is, a short-circuit path is blocked, and the risk of burning is reduced.

Figure 5:
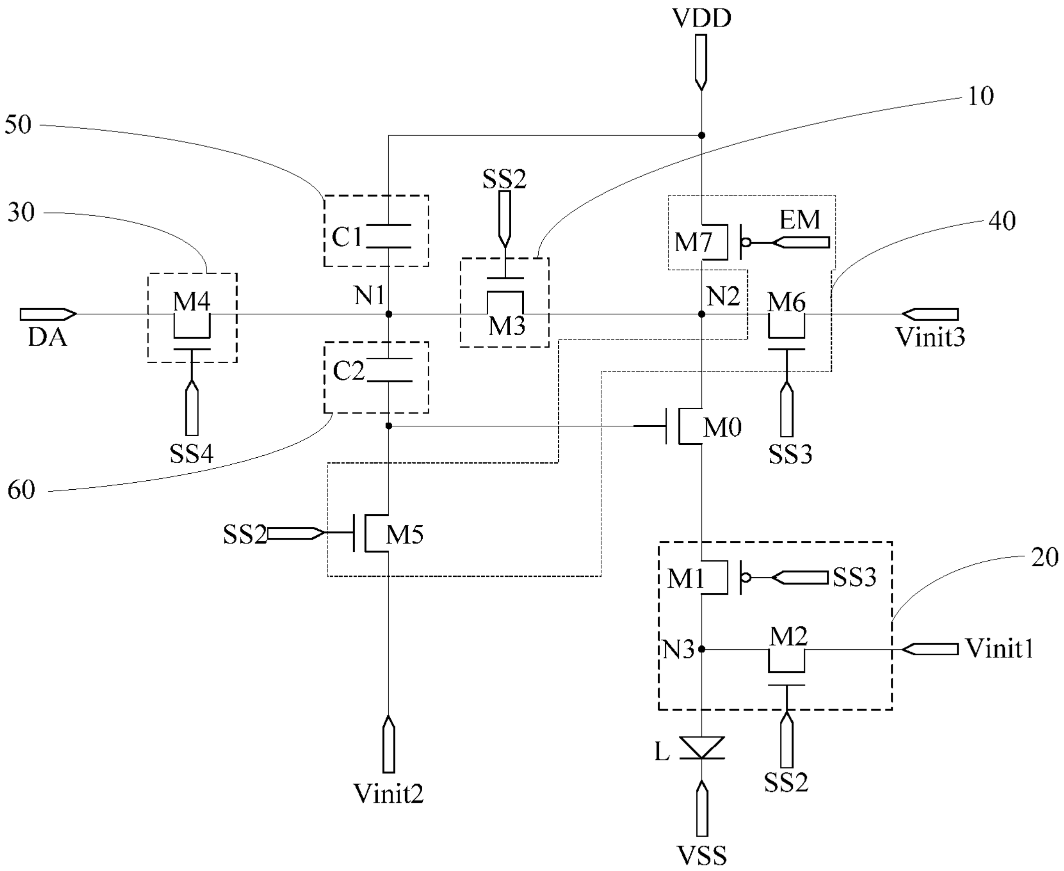
FIG. 5 is a schematic structural diagram of a pixel driving circuit according to an embodiment of the present disclosure.

An embodiment of the present disclosure further provides a schematic structural diagram of a pixel driving circuit, as shown in FIG. 5, which is obtained by modifying the implementations in the foregoing embodiment. Only the differences between the present embodiment and the above embodiment will be described below, and the parts that are substantially the same between the present embodiment and the above embodiment will not be described herein again.

In the embodiment of the present disclosure, the third scan signal terminal SS3 and the fifth scan signal terminal SS5 may be a single signal terminal. For example, as shown in FIG. 5, the gate of the sixth transistor M6 is coupled to the third scan signal terminal SS3. Illustratively, the first transistor M1 is a P-type transistor and the sixth transistor M6 is an N-type transistor.

In the embodiment of the present disclosure, the first scan signal terminal SS1 and the second scan signal terminal SS2 may be a single signal terminal. For example, as shown in FIG. 5, the gates of the third transistor M3 and the fifth transistor M5 are coupled to the second scan signal terminal SS2. Therefore, the number of signal lines can be reduced, and the wiring difficulty can be reduced. Illustratively, the second transistor M2 and the fifth transistor M5 are N-type transistors.

Figure 6:
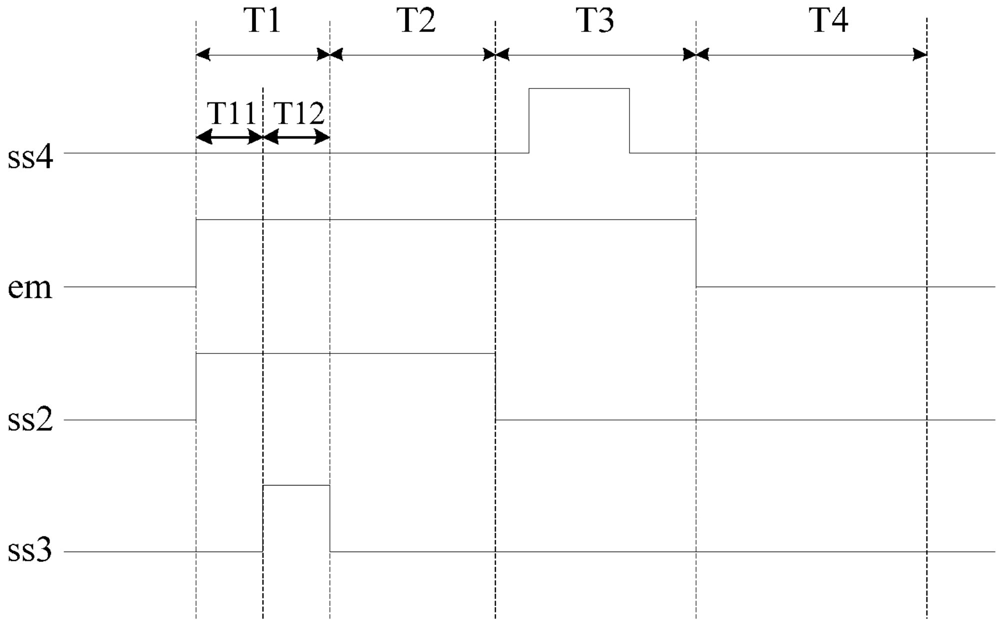
FIG. 6 is a timing diagram of signals for a pixel driving circuit according to an embodiment of the present disclosure.

The timing diagram of the signals corresponding to the pixel driving circuit shown in FIG. 5 may be as shown in FIG. 6. The driving process of the embodiment is similar to the driving process of the pixel driving circuit described above, so the driving process of the embodiment may be implemented by referring to the driving process of the pixel driving circuit described above, and the repeated parts are not described herein again.

Figure 7:
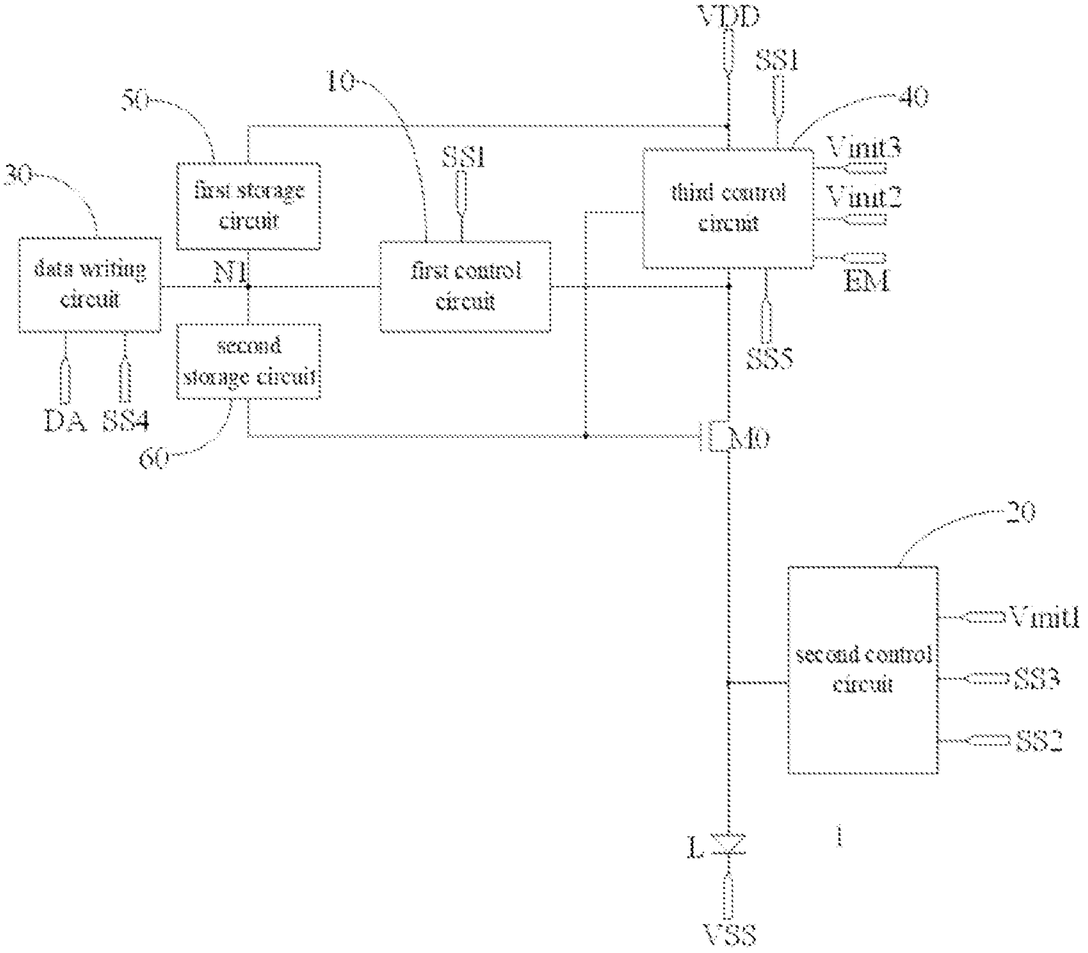
FIG. 7 is a schematic structural diagram of a pixel driving circuit according to an embodiment of the present disclosure.

The embodiment of the present disclosure provides a schematic structural diagram of a pixel driving circuit, as shown in FIG. 7, which is obtained by modifying the implementations in the foregoing embodiment. Only the differences between the present embodiment and the above embodiments will be described below, and the parts that are substantially the same between the present embodiment and the above embodiments will not be described herein again.

Figure 8:
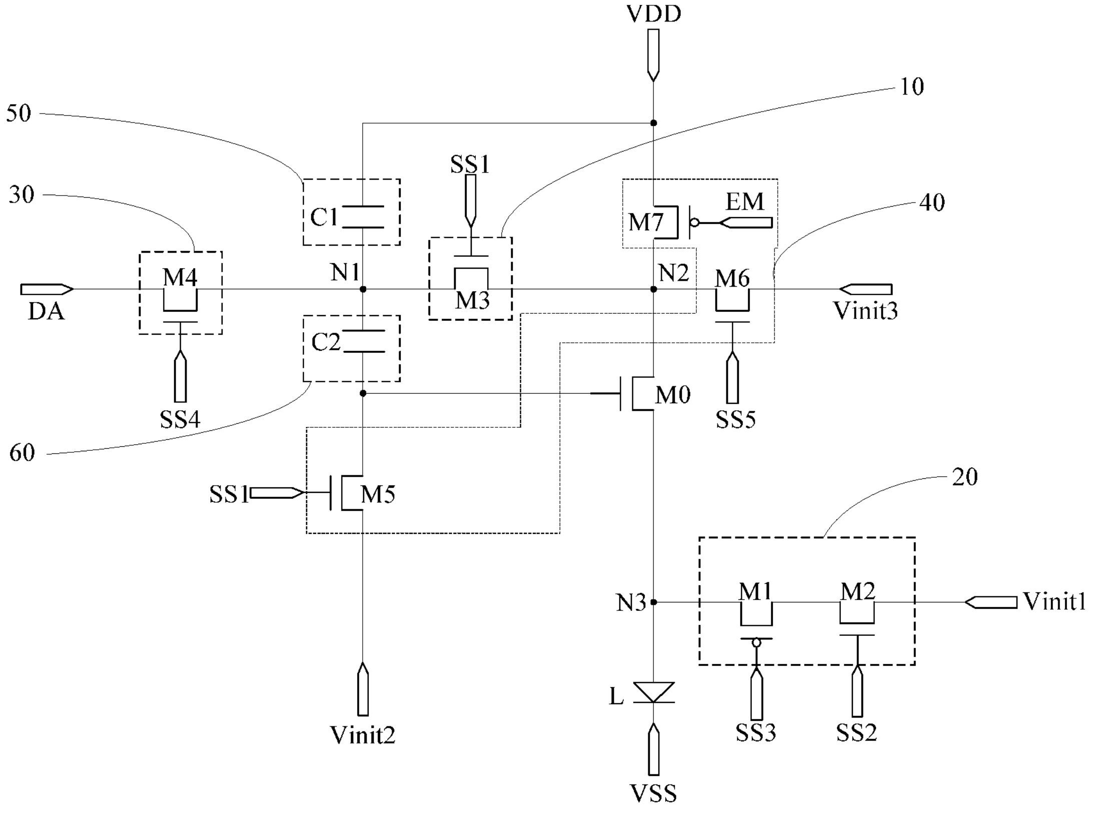
FIG. 8 is a schematic structural diagram of a pixel driving circuit according to an embodiment of the present disclosure.

In the embodiment of the present disclosure, as shown in FIGS. 7 and 8, the second electrode of the driving transistor M0 is coupled to the light-emitting device L, and the second control circuit 20 is coupled to the light-emitting device L; the second control circuit 20 is configured to supply the signal at the first initialization signal terminal Vinit1 to the second electrode of the driving transistor M0 in response to a common control of the signals at the second scan signal terminal SS2 and the third scan signal terminal SS3.

In the embodiment of the present disclosure, as shown in FIG. 8, the second control circuit 20 includes a first transistor M1 and a second transistor M2; a gate of the first transistor M1 is coupled to the third scan signal terminal SS3, a first electrode of the first transistor M1 is coupled to the second electrode of the driving transistor M0, and a second electrode of the first transistor M1 is coupled to a first electrode of the second transistor M2. A gate of the second transistor M2 is coupled to the second scan signal terminal SS2, and a second electrode of the second transistor M2 is coupled to the first initialization signal terminal Vinit1.

In the embodiment of the present disclosure, as shown in FIG. 8, the first transistor M1 is a P-type transistor, and the sixth transistor M6 is an N-type transistor.

The following describes an operation process of the pixel driving circuit provided in the embodiment of the present disclosure by taking the pixel driving circuit shown in FIG. 8 as an example, and referring to the timing diagram of signals shown in FIG. 4.

In the embodiment of the present disclosure, as shown in FIG. 4, em represents a light emission control signal at the light emission control signal terminal EM, ss1 represents a first scan signal at the first scan signal terminal SS1, ss2 represents a second scan signal at the second scan signal terminal SS2, ss3 represents a third scan signal at the third scan signal terminal SS3, ss4 represents a fourth scan signal at the fourth scan signal terminal SS4, and ss5 represents a fifth scan signal at the fifth scan signal terminal SS5.

Furthermore, an initialization period T1, a threshold compensation period T2, a data writing period T3, and a light-emitting period T4 in a display frame are selected.

In the initialization period T1, the initialization period T1 further includes a first period T11 and a second period T12, where during the first period T11, the first transistor M1 is turned on under the control of a low level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned off under the control of a high level of the emission control signal em. The turned-on second transistor M2 and the turned-on first transistor M1 inputs the first initialization signal at the first initialization signal terminal Vinit to the anode of the light-emitting device L (i.e., the third node N3) to initialize the anode of the light-emitting device L (i.e., the third node N3). The turned-on third transistor M3 conducts the first electrode of the driving transistor M0 to the first node N1. The turned-on fifth transistor M5 inputs the second initialization signal at the second initialization signal terminal Vinit2 to the gate of the driving transistor M0 to initialize the gate of the driving transistor M0, so that the driving transistor M0 is turned on. The turned-on driving transistor M0 conducts the first electrode of the driving transistor M0 to the anode of the light-emitting device L (i.e., the third node N3). When the third transistor M3 is turned on, the turned-on first transistor M1 and the turned-on second transistor M2 form a current path from the first node N1 to the first initialization signal terminal Vinit1.

In the second period T12, the first transistor M1 is turned off under the control of a high level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned on under the control of a high level of the fifth scan signal ss5, and the seventh transistor M7 is turned off under the control of a high level of the light emission control signal em. The turned-on fifth transistor M5 inputs the second initialization signal at the second initialization signal terminal Vinit2 to the gate of the driving transistor M0 to initialize the gate of the driving transistor M0. The turned-on sixth transistor M6 inputs the third initialization signal at the third initialization signal terminal Vinit3 to the first electrode of the driving transistor M0 (i.e., the second node N2) to initialize the first electrode of the driving transistor M0 (i.e., the second node N2). The turned-on third transistor M3 conducts the first electrode of the driving transistor M0 to the first node N1, so that the third initialization signal at the third initial voltage signal terminal Vinit3 is input to the first node N1 to initialize the first node N1. The third initialization signal at the third initialization signal terminal Vinit3 is a high level voltage, and the high level voltage is input to the first electrode of the driving transistor M0, so that a high level voltage may be applied to the first electrode of the driving transistor M0, and Vgs is ensured to be less than Vth, thereby ensuring that the driving transistor M0 is in a turned-on state, where Vgs represents a voltage difference between the gate and the first electrode of the driving transistor M0, and Vth represents a threshold voltage of the driving transistor M0.

In the threshold compensation period T2, the first transistor M1 is turned on under the control of a low level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned off under the control of a high level of the light emission control signal em. The turned-on fifth transistor M5 inputs the second initialization signal at the second initialization signal terminal Vinit2 to the gate of the driving transistor M0, so that a voltage of the gate of the driving transistor M0 is V1, where V1 represents a voltage value of the second initialization signal at the second initialization signal terminal Vinit 2. The turned-on third transistor M3 conducts the first electrode of the driving transistor M0 to the first node N1. The turned-on second transistor M2 and the turned-on first transistor M1 inputs the first initialization signal at the first initialization signal terminal Vinit1 to the anode of the light-emitting device L (i.e., the third node N3). The driving transistor M0 is still turned on, turned-on driving transistor M0 conducts the second electrode of the driving transistor M0 to the anode of the light-emitting device L (i.e., the third node N3). When the driving transistor M0 is still turned on, the turned-on first transistor M1 and the turned-on second transistor M2 form a current path from the first node N1 to the first initialization signal terminal Vinit1 when the third transistor M3 is turned on, so that the threshold voltage Vth of the driving transistor M0 is input to the first node N1. When Vgs is equal to Vth, the driving transistor M0 is turned off, and in this case, a voltage VN2 of the second node N2 is equal to a difference between V1 and the threshold voltage Vth, i.e., VN2=V1−Vth, and since the third transistor M3 is in the turned-on state, the voltage VN1 of the first node N1 is equal to VN2, i.e., VN1=VN2=V1−Vth.

In the data writing period T3, the first transistor M1 is turned on under the control of a low level of the third scan signal ss3, the second transistor M2 is turned off under the control of a low level of the second scan signal ss2, the third transistor M3 and the fifth transistor M5 are turned off under the control of a low level of the first scan signal ss1, the fourth transistor M4 is turned on under the control of a high level of the fourth scan signal ss4, the sixth transistor M6 is turned off under the control of a low level of the fifth scan signal ss5, and the seventh transistor M7 is turned off under the control of a high level of the light emission control signal em. The turned-on fourth transistor M4 supplies the data voltage Vda loaded onto the data signal terminal DA to the driving transistor M0, the voltage VN1 of the first node N1 is changed from V1−Vth to Vda, and a voltage change amount of the first node N1 is ΔVN1, which is equal to Vda−V1+Vth. Due to the existence of the second capacitor C2, ΔVN1 is coupled to the voltage of the gate of the driving transistor M0 is, and the voltage of the gate of the driving transistor M0 jumps from V1 to Vda+Vth.

In the light-emitting period T4, the first transistor M1 is turned on under the control of a low level of the third scan signal ss3, the second transistor M2 is turned off under the control of a low level of the second scan signal ss2, the third transistor M3 and the fifth transistor M5 are turned off under the control of a low level of the first scan signal ss1, the fourth transistor M4 is turned off under the control of the low level of a fourth scan signal ss4, the sixth transistor M6 is turned off under the control of a low level of the fifth scan signal ss5, and the seventh transistor M7 is turned on under the control of a low level of the light emission control signal em. The turned-on seventh transistor M7 conducts the first power terminal VDD to the first electrode of the driving transistor M0 (i.e., the second node N2), the turned-on driving transistor M0 conducts the first electrode of the driving transistor M0 to the anode of the light-emitting device L (i.e., the third node N3), so that the driving transistor M0 generates a current for driving the light-emitting device L to emit light, and the first power terminal VDD, the seventh transistor M7, the driving transistor M0, the light-emitting device L and the second power terminal VSS form a current path, thereby driving the light-emitting device L to emit light.

Figure 9:
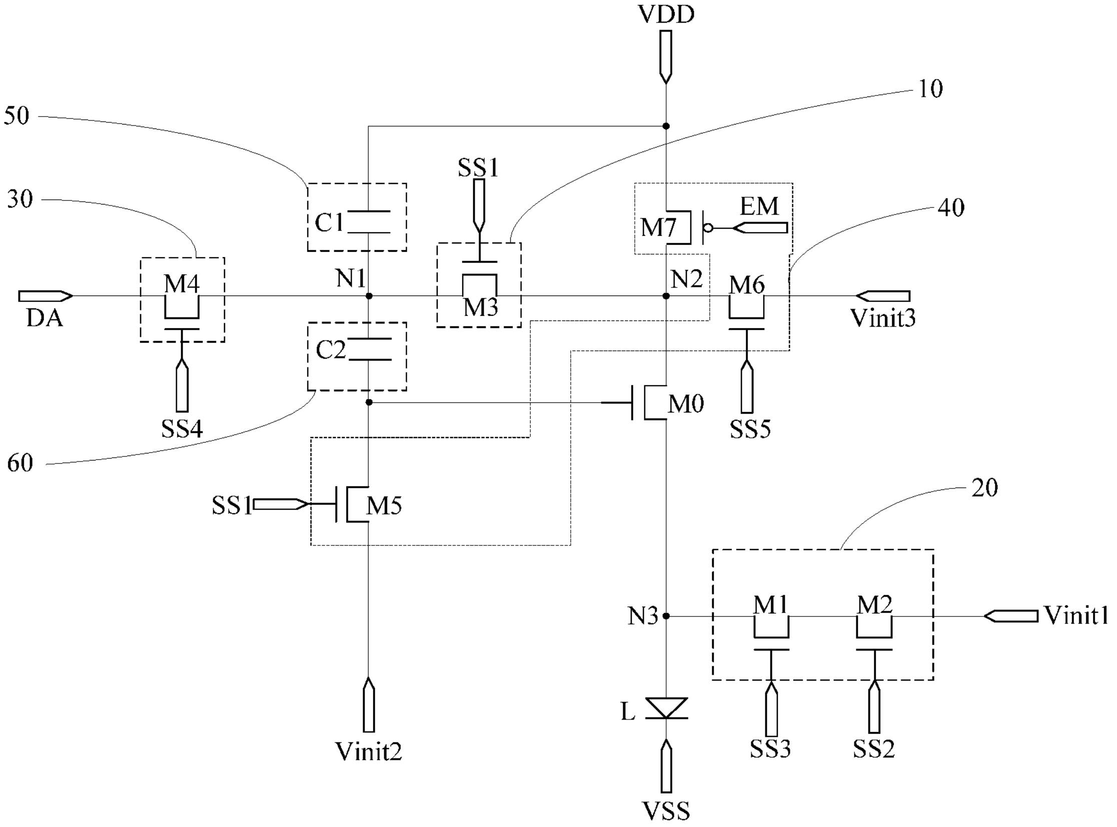
FIG. 9 is a schematic structural diagram of a pixel driving circuit according to an embodiment of the present disclosure.

An embodiment of the present disclosure provides a schematic structural diagram of a pixel driving circuit, as shown in FIG. 9, which is obtained by modifying the implementations in the foregoing embodiment. Only the differences between the present embodiment and the above embodiments will be described below, and the parts that are substantially the same between the present embodiment and the above embodiments will not be described herein again.

In the embodiment of the present disclosure, as shown in FIG. 9, the first transistor M1 is an N-type transistor, and the sixth transistor M6 is an N-type transistor.

Figure 10:
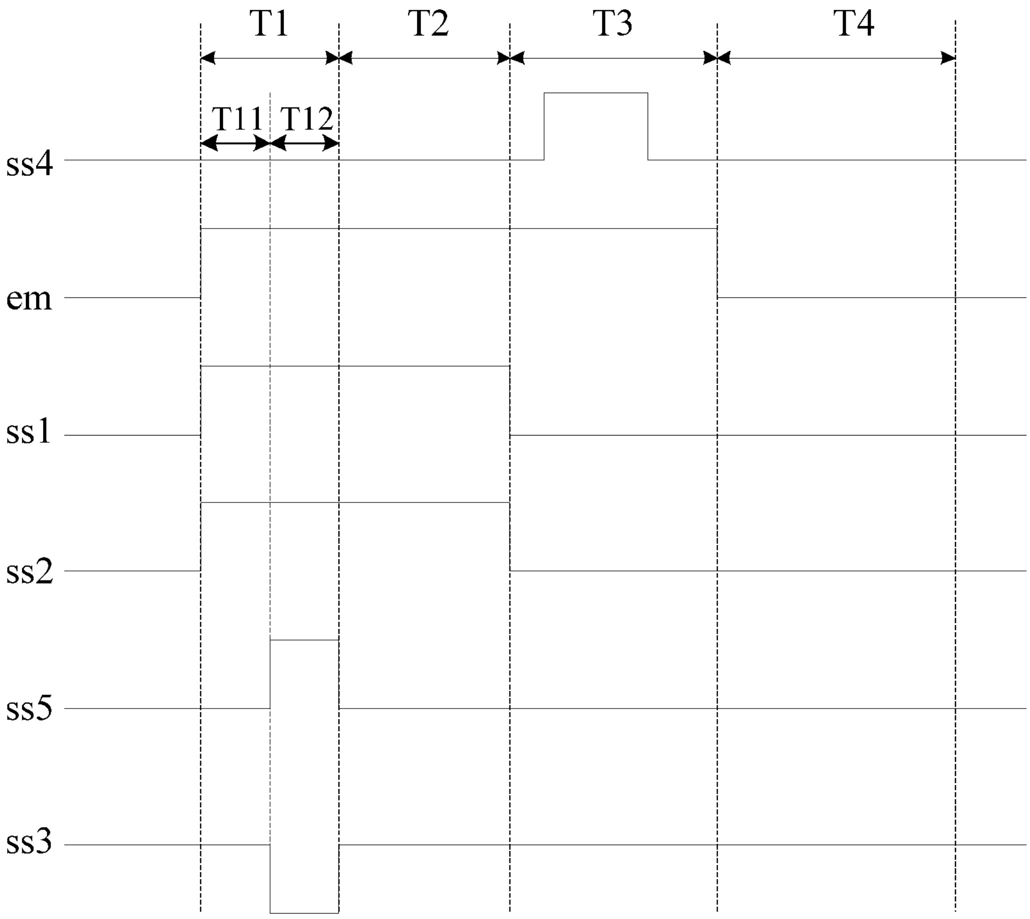
FIG. 10 is a timing diagram of signals for a pixel driving circuit according to embodiments of the present disclosure.

In the embodiment of the present disclosure, as shown in FIG. 10, a phase of the signal at the third scan signal terminal SS3 is opposite to a phase of the signal at the fifth scan signal terminal SS5.

The following describes an operation process of the pixel driving circuit provided in the embodiment of the present disclosure with reference to the timing diagram of signals shown in FIG. 10 by taking the pixel driving circuit shown in FIG. 9 as an example.

In the embodiment of the present disclosure, as shown in FIG. 10, em represents a light emission control signal at the light emission control signal terminal EM, ss1 represents a first scan signal at the first scan signal terminal SS1, ss2 represents a second scan signal at the second scan signal terminal SS2, ss3 represents a third scan signal at the third scan signal terminal SS3, ss4 represents a fourth scan signal at the fourth scan signal terminal SS4, and ss5 represents a fifth scan signal at the fifth scan signal terminal SS5.

Furthermore, an initialization period T1, a threshold compensation period T2, a data writing period T3, and a light-emitting period T4 in a display frame are selected.

In the initialization period T1, the initialization period T1 further includes a first period T11 and a second period T12, where during the first period T11, the first transistor M1 is turned on under the control of a high level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned off under the control of a high level of the light emission control signal em. The turned-on second transistor M2 and the turned-on transistor M1 input the first initialization signal at the first initialization signal terminal Vinit1 to the anode of the light-emitting device L (i.e., the third node N3) to initialize the anode of the light-emitting device L (i.e., the third node N3). The turned-on third transistor M3 conducts the first electrode of the driving transistor M0 to the first node N1. The turned-on fifth transistor M5 inputs the second initialization signal at the second initialization signal terminal Vinit2 to the gate of the driving transistor M0 to initialize the gate of the driving transistor M0, so that the driving transistor M0 is turned on. The turned-on driving transistor M0 conducts the first electrode of the driving transistor M0 to the anode of the light-emitting device L (i.e., the third node N3). When the third transistor M3 is turned on, the turned-on first transistor M1 and the turned-on second transistor M2 form a current path from the first node N1 to the first initialization signal terminal Vinit1.

In the second period T12, the first transistor M1 is turned off under the control of a low level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned on under the control of a high level of the fifth scan signal ss5, and the seventh transistor M7 is turned off under the control of a high level of the light emission control signal em. The turned-on fifth transistor M5 inputs the second initialization signal at the second initialization signal terminal Vinit2 to the gate of the driving transistor M0 to initializes the gate of the driving transistor M0. The turned-on sixth transistor M6 inputs the third initialization signal at the third initialization signal terminal Vinit3 to the first electrode of the driving transistor M0 (i.e., the second node N2) to initialize the first electrode of the driving transistor M0 (i.e., the second node N2). The turned-on third transistor M3 conducts the first electrode of the driving transistor M0 to the first node N1, so that the third initialization signal at the third initial voltage signal terminal Vinit3 is input to the first node N1 to initialize the first node N1. The third initialization signal at the third initialization signal terminal Vinit3 is a high level voltage, and the high level voltage is input to the first electrode of the driving transistor M0, so that a high level voltage may be applied to the first electrode of the driving transistor M0, and Vgs is ensured to be less than Vth, thereby ensuring that the driving transistor M0 is in the turned-on state, where, Vgs represents a voltage difference between the gate and the first electrode of the driving transistor M0, and Vth represents a threshold voltage of the driving transistor M0.

In the threshold compensation period T2, the first transistor M1 is turned on under the control of a high level of the third scan signal ss3, the second transistor M2 is turned on under the control of a high level of the second scan signal ss2, the third transistor M3 and the fifth transistor M5 are turned on under the control of a high level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned off under the control of a high level of the light emission control signal em. The turned-on fifth transistor M5 inputs the second initialization signal at the second initialization signal terminal Vinit2 to the gate of the driving transistor M0, and a voltage of the gate of the driving transistor M0 is V1, where V1 represents a voltage value of the second initialization signal at the second initialization signal terminal Vinit2. The turned-on third transistor M3 conducts the first electrode of the driving transistor M0 to the first node N1. The turned-on second transistor M2 and the turned-on first transistor M inputs the first initialization signal at the first initialization signal terminal Vinit1 to the anode of the light-emitting device L (i.e., the third node N3). The driving transistor M0 is still turned on, and the turned-on driving transistor M0 conducts the first electrode of the driving transistor M0 to the anode of the light-emitting device L (i.e., the third node N3). When the driving transistor M0 is still turned on, the turned-on first transistor M1 and the turned-on second transistor M2 form a current path from the first node N1 to the first initialization signal terminal Vinit1 in a case where the third transistor M3 is turned on, so that the threshold voltage Vth of the driving transistor M0 is input to the first node N1. In a case where Vgs is equal to Vth, the driving transistor M0 is turned off, and in this case, a voltage VN2 of the second node N2 is equal to a difference between V1 and the threshold voltage Vth, i.e., VN2=V1−Vth, and since the third transistor M3 is in the turned-on state, the voltage VN1 of the first node N1 is equal to VN2, i.e., VN1=VN2=V1−Vth.

In the data writing period T3, the first transistor M1 is turned on under the control of a high level of the third scan signal ss3, the second transistor M2 is turned off under the control of a low level of the second scan signal ss2, the third transistor M3 and the fifth transistor M5 are turned off under the control of a low level of the first scan signal ss1, the fourth transistor M4 is turned on under the control of a high level of the fourth scan signal ss4, the sixth transistor M6 is turned off under the control of a low level of the fifth scan signal ss5, and the seventh transistor M7 is turned off under the control of a high level of the light emission control signal em. The turned-on fourth transistor M4 supplies the data voltage Vda loaded onto the data signal terminal DA to the driving transistor M0, so that the voltage VN1 of the first node N1 is changed from V1−Vth to Vda, and a voltage change amount of the first node N1 is ΔVN1, which is equal to Vda−V1+Vth. Due to the existence of the second capacitor C2, ΔVN1 is coupled to a voltage of the gate of the driving transistor M0, and the voltage of the gate of the driving transistor M0 jumps from V1 to Vda+Vth.

In the light-emitting period T4, the first transistor M1 is turned on under the control of a high level of the third scan signal ss3, the second transistor M2 is turned off under the control of a low level of the second scan signal ss2, the third transistor M3 and the fifth transistor M5 are turned off under the control of a low level of the first scan signal ss1, the fourth transistor M4 is turned off under the control of a low level of the fourth scan signal ss4, the sixth transistor M6 is turned off under the control of a low level of the fifth scan signal ss5, and the seventh transistor M7 is turned on under the control of a low level of the light emission control signal em. The turned-on seventh transistor M7 conducts the first power terminal VDD to the first electrode of the driving transistor M0 (i.e., the second node N2), the turned-on dirving transistor M0 conducts the first electrode of the driving transistor M0 to the anode of the light-emitting device L (i.e., the third node N3), so that the driving transistor M0 generates a current for driving the light-emitting device L to emit light, and the first power terminal VDD, the seventh transistor M7, the driving transistor M0, the light-emitting device L and the second power terminal VSS form a current path, thereby driving the light-emitting device L to emit light.

Figure 11:
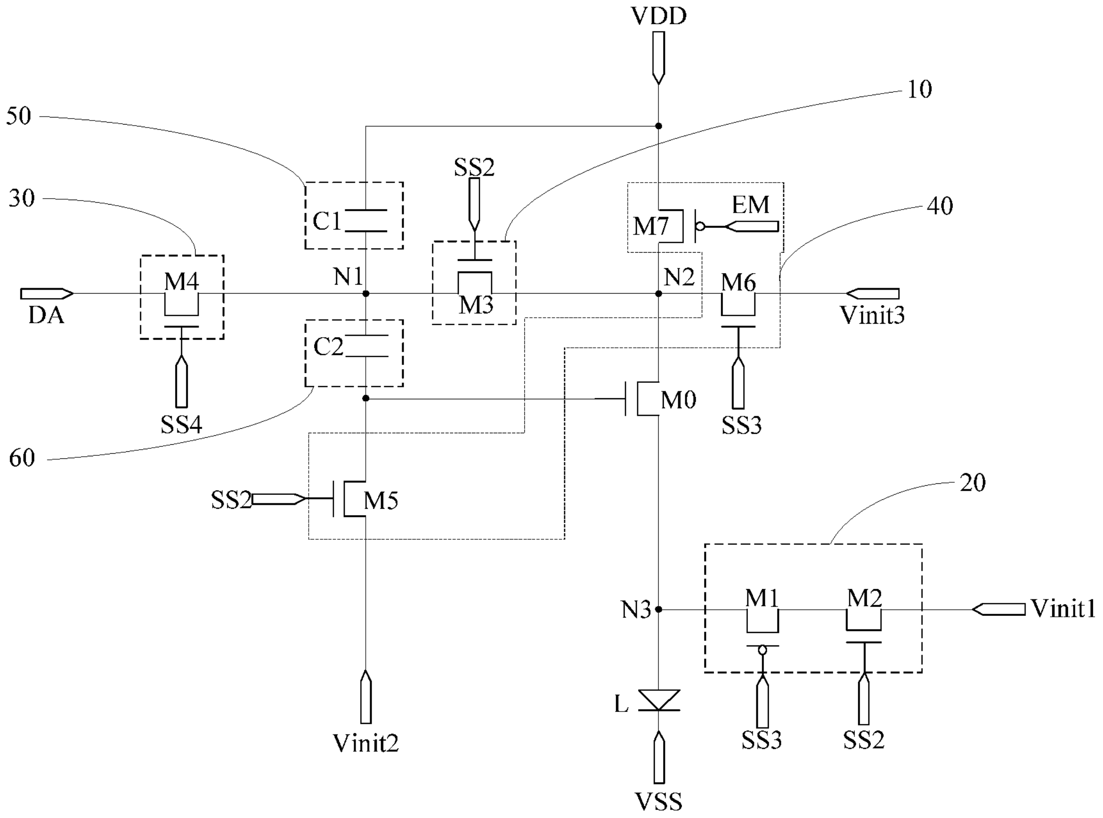
FIG. 11 is a schematic structural diagram of a pixel driving circuit according to an embodiment of the present disclosure.

An embodiment of the present disclosure provides a schematic structural diagram of a pixel driving circuit, as shown in FIG. 11, which is obtained by modifying the implementations in the foregoing embodiment. Only the differences between the present embodiment and the above embodiments will be described below, and the parts that are substantially the same between the present embodiment and the above embodiments will not be described herein again.

In the embodiment of the present disclosure, the third scan signal terminal SS3 and the fifth scan signal terminal SS5 may be a single signal terminal. For example, as shown in FIG. 11, the gate of the sixth transistor M6 is coupled to the third scan signal terminal SS3.

In the embodiment of the present disclosure, the first scan signal terminal SS1 and the second scan signal terminal SS2 may be a single signal terminal. For example, as shown in FIG. 11, the gates of the third transistor M3 and the fifth transistor M5 are coupled to the second scan signal terminal SS2. Therefore, the number of signal lines can be reduced, and the wiring difficulty can be reduced.

A timing diagram of signals corresponding to the pixel driving circuit shown in FIG. 11 may be as shown in FIG. 6. The driving process of the pixel driving circuit in the present embodiment is similar to the driving process of the pixel driving circuit described above, so the driving process of the present embodiment can be implemented by referring to the driving process of the pixel driving circuit described above, and the same parts are not described herein again.

An embodiment of the present disclosure further provides a display apparatus, which includes a plurality of sub-pixels; where each sub-pixel includes the pixel driving circuit. The principle of the display apparatus for solving the problems is similar to that of the pixel driving circuit, so the implementations of the display apparatus can refer to the implementations of the pixel driving circuit, and the same parts are not described herein again.

In a specific implementation, the display apparatus in the embodiment of the present disclosure may be: any product or component with a display function, such as a mobile phone, a tablet computer, a television, a display, a notebook computer, a digital photo frame, a navigator and the like. Other essential components of the display apparatus are understood by those skilled in the art, and are not described herein or should not be construed as limiting the invention.

The foregoing is merely an example of the specific structure of each module in the pixel circuit provided in the embodiments of the present disclosure, and in implementation, the specific structure is not limited to the structure provided in the embodiments of the present disclosure, and may be other structures known to those skilled in the art, which is not limited herein.

While the embodiments of the present disclosure have been described, additional variations and modifications in those embodiments may occur to those skilled in the art once they learn of the basic concept. Therefore, it is intended that the appended claims be interpreted as including the embodiments and all variations and modifications that fall within the scope of the present disclosure.

It will be apparent to those skilled in the art that various changes and modifications may be made in the embodiments of the disclosure without departing from the spirit and scope of the embodiments of the present disclosure. Thus, if such modifications and variations of the embodiments of the present disclosure are within the scope of the claims of the present disclosure and their equivalents, the present disclosure is also intended to encompass such modifications and changes.

What is claimed is:

1. A pixel driving circuit, comprising:

a light-emitting device;

a driving transistor configured to generate a current for driving the light-emitting device to emit light according to a data voltage;

a first control circuit configured to conduct a first electrode of the driving transistor to a first node in response to a signal at a first scan signal terminal;

a second control circuit configured to form, in response to signals at a second scan signal terminal and a third scan signal terminal, a current path from the first node to a first initialization signal terminal in a case where the first control circuit conducts the first electrode of the driving transistor to the first node, to allow a threshold voltage of the driving transistor to be input to the first node;

a data writing circuit configured to input the data voltage of a data signal terminal to the first node in response to a signal at a fourth scan signal terminal, to change a voltage of the first node from V1−Vth to Vda;

a third control circuit configured to supply a signal at a second initialization signal terminal to a gate of the driving transistor in response to the signal at the first scan signal terminal, to supply a signal at a third initialization signal terminal to the first electrode of the driving transistor in response to a signal at a fifth scan signal terminal, and to supply a signal at a first power terminal to the first electrode of the driving transistor in response to a signal at a light emission control signal terminal;

a first storage circuit configured to keep a voltage difference between the first node and the first power terminal stable; and a second storage circuit configured to keep a voltage difference between the first node and the gate of the driving transistor stable, and to change a voltage of the gate of the driving transistor from V1 to Vda+Vth in a case that the voltage of the first node is changed from V1−Vth to Vda, where V1 represents a voltage value of a second initialization signal at the second initialization signal terminal, Vth represents the threshold voltage of the driving transistor, and Vda represents the data voltage loaded onto the data signal terminal.

2. The pixel driving circuit according to claim 1, wherein a second electrode of the driving transistor is coupled to the light-emitting device through the second control circuit; and the second control circuit is configured to conduct the second electrode of the driving transistor to the light-emitting device in response to the signal at the third scan signal terminal, and to supply a signal at the first initialization signal terminal to the light-emitting device in response to the signal at the second scan signal terminal.

3. The pixel driving circuit according to claim 2, wherein the second control circuit comprises a first transistor and a second transistor;

a gate of the first transistor is coupled to the third scan signal terminal, a first electrode of the first transistor is coupled to the light-emitting device, and a second electrode of the first transistor is coupled to the second electrode of the driving transistor; and a gate of the second transistor is coupled to the second scan signal terminal, a first electrode of the second transistor is coupled to the light-emitting device, and a second electrode of the second transistor is coupled to the first initialization signal terminal.

4. The pixel driving circuit according to claim 1, wherein a second electrode of the driving transistor is coupled to the light-emitting device, and the second control circuit is coupled to the light-emitting device; and the second control circuit is configured to supply the signal at the first initialization signal terminal to the second electrode of the driving transistor in response to a common control of the signals at the second scan signal terminal and the third scan signal terminal.

5. The pixel driving circuit according to claim 4, wherein the second control circuit comprises a first transistor and a second transistor;

a gate of the first transistor is coupled to the third scan signal terminal, a first electrode of the first transistor is coupled to the second electrode of the driving transistor, and a second electrode of the first transistor is coupled to a first electrode of the second transistor; and a gate of the second transistor is coupled to the second scan signal terminal, and a second electrode of the second transistor is coupled to the first initialization signal terminal.

6. The pixel driving circuit according to claim 5, wherein the first control circuit comprises a third transistor; and a gate of the third transistor is coupled to the first scan signal terminal, a first electrode of the third transistor is coupled to the first electrode of the driving transistor, and a second electrode of the third transistor is coupled to the first node.

7. The pixel driving circuit according to claim 6, wherein the data writing circuit comprises a fourth transistor; and a gate of the fourth transistor is coupled to the fourth scan signal terminal, a first electrode of the fourth transistor is coupled to the data signal terminal, and a second electrode of the fourth transistor is coupled to the first node.

8. The pixel driving circuit according to claim 7, wherein the third control circuit comprises a fifth transistor, a sixth transistor, and a seventh transistor;

a gate of the fifth transistor is coupled to the first scan signal terminal, a first electrode of the fifth transistor is coupled to the gate of the driving transistor, and a second electrode of the fifth transistor is coupled to the second initial voltage signal terminal;

a gate of the sixth transistor is coupled to the fifth scan signal terminal, a first electrode of the sixth transistor is coupled to the first electrode of the driving transistor, and a second electrode of the sixth transistor is coupled to the third initialization signal terminal; and a gate of the seventh transistor is coupled to the light emission control signal terminal, a first electrode of the seventh transistor is coupled to the first electrode of the driving transistor, and a second electrode of the seventh transistor is coupled to the first power terminal.

9. The pixel driving circuit according to claim 8, wherein the first storage circuit comprises a first capacitor having a first electrode coupled to the first power terminal and a second electrode coupled to the first node; and/or the second storage circuit comprises a second capacitor having a first electrode coupled to the first node and a second electrode coupled to the gate of the driving transistor.

10. The pixel driving circuit according to claim 9, wherein the third scan signal terminal and the fifth scan signal terminal are a single signal terminal.

11. The pixel driving circuit according to claim 9, wherein a phase of the signal at the third scan signal terminal is opposite to a phase of the signal at the fifth scan signal terminal.

12. The pixel driving circuit according to claim 1, wherein the first control circuit comprises a third transistor; and a gate of the third transistor is coupled to the first scan signal terminal, a first electrode of the third transistor is coupled to the first electrode of the driving transistor, and a second electrode of the third transistor is coupled to the first node.

13. The pixel driving circuit according to claim 1, wherein the data writing circuit comprises a fourth transistor; and a gate of the fourth transistor is coupled to the fourth scan signal terminal, a first electrode of the fourth transistor is coupled to the data signal terminal, and a second electrode of the fourth transistor is coupled to the first node.

14. The pixel driving circuit according to claim 1, wherein the third control circuit comprises a fifth transistor, a sixth transistor, and a seventh transistor;

a gate of the fifth transistor is coupled to the first scan signal terminal, a first electrode of the fifth transistor is coupled to the gate of the driving transistor, and a second electrode of the fifth transistor is coupled to the second initial voltage signal terminal;

a gate of the sixth transistor is coupled to the fifth scan signal terminal, a first electrode of the sixth transistor is coupled to the first electrode of the driving transistor, and a second electrode of the sixth transistor is coupled to the third initialization signal terminal; and a gate of the seventh transistor is coupled to the light emission control signal terminal, a first electrode of the seventh transistor is coupled to the first electrode of the driving transistor, and a second electrode of the seventh transistor is coupled to the first power terminal.

15. The pixel driving circuit according to claim 1, wherein the first storage circuit comprises a first capacitor having a first electrode coupled to the first power terminal and a second electrode coupled to the first node; and/or the second storage circuit comprises a second capacitor having a first electrode coupled to the first node and a second electrode coupled to the gate of the driving transistor.

16. The pixel driving circuit according to claim 1, wherein the third scan signal terminal and the fifth scan signal terminal are a single signal terminal.

17. The pixel driving circuit according to claim 1, wherein a phase of the signal at the third scan signal terminal is opposite to a phase of the signal at the fifth scan signal terminal.

18. The pixel driving circuit according to claim 1, wherein the first scan signal terminal and the second scan signal terminal are a single signal terminal.

19. A display apparatus, comprising the pixel driving circuit according to claim 1.

20. A method for driving the pixel driving circuit according to claim 1, comprising an initialization period, a threshold compensation period, a data writing period and a light-emitting period, wherein, in the initialization period, the first control circuit conducts, in response to the signal at the first scan signal terminal, the first electrode of the driving transistor to the first node; the second control circuit forms, in response to the signals at the second scan signal terminal and the third scan signal terminal, the current path from the first node to the first initialization signal terminal; the third control circuit supplies, in response to the signal at the first scan signal terminal, the signal at the second initialization signal terminal to the gate of the driving transistor;

in the threshold compensation period, the first control circuit conducts, in response to the signal at the first scan signal terminal, the first electrode of the driving transistor to the first node; the second control circuit forms, in response to the signals at the second scan signal terminal and the third scan signal terminal, the current path from the first node to the first initialization signal terminal, to allow the threshold voltage of the driving transistor to be input into the first node; the third control circuit supplies, in response to the signal at the first scan signal terminal, the signal at the second initialization signal terminal to the gate of the driving transistor;

in the data writing period, the data writing circuit inputs, in response to the signal at the fourth scan signal terminal, the data voltage of the data signal terminal into the first node, to change the voltage of the first node from V1−Vth to Vda; the voltage of the gate of the driving transistor is changed from V1 to Vda+Vth due to the action of the second storage circuit, where V1 represents the voltage value of the second initialization signal at the second initialization signal terminal, Vth represents the threshold voltage of the driving transistor, and Vda represents the data voltage loaded onto the data signal terminal;

in the light-emitting period, the third control circuit supplies, in response to the signal at the light emission control signal terminal, the signal at the first power terminal to the first electrode of the driving transistor; the second control circuit conducts, in response to the signal at the third scan signal terminal, the second electrode of the driving transistor to the light-emitting device.

* * * * *